United States Patent [19]

Raisor

[11] Patent Number: 4,718,955
[45] Date of Patent: Jan. 12, 1988

[54] METHOD OF RECOVERING POWERED ALUMINUM FROM ALUMINUM-POLYMER MIXTURES

[75] Inventor: Ralph C. Raisor, Brigham City, Utah

[73] Assignee: Morton Thiokol, Inc., Chicago, Ill.

[21] Appl. No.: 804,551

[22] Filed: Dec. 4, 1985

[51] Int. Cl.$^4$ ............................................. D03D 23/00
[52] U.S. Cl. ................................ 149/109.6; 75/68 C; 149/124
[58] Field of Search ............................ 149/109.6, 124; 75/68 C

[56] References Cited

U.S. PATENT DOCUMENTS 3,165,397  1/1965  Lobo .................................... 75/68 C
3,867,296  2/1975  Hunt .................................... 252/33.4
4,548,651  10/1985  Ramsey ................................. 134/18

Primary Examiner—Stephen J. Lechert, Jr.
Attorney, Agent, or Firm—Gerald K. White

[57] ABSTRACT

Solid composite propellants for rocket motors normally consist of an oxidizer and and aluminum powder cured in a polymeric binder system. The oxidizer, ammonium perchlorate, can be readily removed by suitable solvents leaving a residue consisting primarily of aluminum and polymer. The aluminum and polymer are separated by a process that is based upon the differential oxidation of the polymer leaving the aluminum in its original powder form. Aluminum metal forms, on exposure to air, an extremely tough inert aluminum oxide coating. Because of this, aluminum is extremely resistant to further oxidation even at temperatures up to its melting point at 660° C. Most organic compounds, including polymers, are oxidized to carbon dioxide at much lower temperatures (400°-600° C.). Due to this difference in reactivity, it is possible to remove the polymer from the aluminum as carbon dioxide leaving the aluminum residue.

4 Claims, No Drawings

METHOD OF RECOVERING POWERED ALUMINUM FROM ALUMINUM-POLYMER MIXTURES

BACKGROUND OF THE INVENTION

1. Field of the Invention

The present invention relates t solid propellant disposal and recovery, and more particularly, to a method of recovering aluminum from waste composite aluminum-polymer mixtures.

2. Description of the Prior Art

A considerable amount of waste propellant is produced during the manufacture of solid propellant rocket motors. Such waste propellant is caused by a number of factors including, for example, the excess cast into the motor casing to compensate for shrinkage, from masterbatches that do not meet specifications, and overage motors that are removed from service. Much of this waste propellant has been scrapped in the past and burned in open burning pits since the flammability and rubbery characteristics have been believed to prevent economical reclamation. The cost of burning waste propellant is considerable. In addition, open pit burning is hazardous and environmentally unacceptable.

Composite propellants normally consist of an oxidizer and aluminum powder cured in a polymeric binder system. There may also be various other ingredients for tailoring physical or ballistic properties. The oxidizer, generally ammonium perchlorate (AP), can be readily removed from the propellant leaving a residue consisting primarily of aluminum and polymer. Methods of removing, by shredding and leaching, ammonium perchlorate from composite propellants are disclosed in U.S. Pat. Nos. 3,451,789, issued to Meldon J. McIntosh on Jun. 24, 1969, 4,198,209, issued on Apr. 15, 1980 to Robert A. Frosch, Administrator of the National Aeronautics and Space Administration, with respect to an invention of Graham C. Shaw and Meldon J. McIntosh, and in the copending patent application Ser. No. 659,796, filed on Oct. 11, 1984 by Meldon J. McIntosh.

Studies have been made on the recovery by chemical solvent means of aluminum from propellants. The general approach has been to polymerize, or hydrolyze, the binder directly in the presence of the propellant ingredients. Catalysts or solvents have been used. These have enabled a partial breakdown of the binder system, but has allowed the recovery of only a small part of the aluminum present and that in an impure or contaminated state. In U.S. Pat. No. 4,229,182, issued on Oct. 21, 1980 to Robert A. Frosch, Administrator of the National Aeronautics and Space Administration with respect to an invention of Graham C. Shaw, there is disclosed a method of recovering aluminum powder from a solid propellant containing less than 15% oxidizer comprising dissolving the binder in an active transesterification solvent, filtering the solution, and then washing the recovered aluminum in a hydrocarbon solvent.

Due to the expense of the reaction techniques, the solvents required, and the necessary filtration and washing, the foregoing prior art methods for recovering aluminum from waste solid propellants have been ineffective, any recovery value of the aluminum being questionable when offset by the cost of recovery.

Thus, there is a need and a demand in the art for an improved method for recovering aluminum from aluminum-polymer mixtures. The present invention was devised to fill the technological gap that has existed for such a method.

SUMMARY OF THE INVENTION

An object of the invention is to provide an effective process for the recovery of aluminum from aluminum-polymer mixtures.

Another object of the invention is to provide a practicable and cost-effective process for the recovery of aluminum from aluminum-polymer mixtures that involves minimal environmental contamination with the polymer being converted to innocuous carbon dioxide and the aluminum being recovered for recycling.

In accomplishing these and other objects according to the present invention, there is provided a process for the recovery of powdered aluminum from aluminum-polymer mixtures that is based upon the differential oxidation of the polymer, leaving the aluminum in its original powder form. Aluminum metal forms, upon exposure to air, an extremely tough inert aluminum oxide coating. Because of this, aluminum is extremely resistant to further oxidation even at temperatures up to its melting point at 660° C. Most organic compounds, including polymers, are oxidized to carbon dioxide at much lower temperatures (400°-600° C.). Due to this difference in reactivity, it is possible to remove the polymer from the aluminum as carbon dioxide leaving the aluminum residue. Very high yields (essentially 100%) are possible with this method.

The various features of novelty which characterize the present invention will be better understood and appreciated from the following detailed description of a preferred embodiment thereof and are pointed out with particularity in the annexe claims.

DESCRIPTION OF A PREFERRED EMBODIMENT

Generally, solid propellants comprise an organic binder, specifically an elastomeric hydrocarbon binder, containing from about 75 to 89% of solid consisting of oxidizer and particulate metal interspersed in the binder. The oxidizer is usually present in an amount from 55-85% by weight and the metal powder from 5-30% by weight of the propellant. One of the most commonly used metal fuels is aluminum (Al). The specific embodiment disclosed herein is directed to this material.

The binder component of the propellant includes an elastic hydrocarbon, curing ingredients and plasticizer. Preferred binders for solid rocket motor propellants are elastomeric hydrocarbon polymers formed by the chain extension and crosslinking reaction of functionally terminated liquid polybutadiene polymers. Such polymers may include carboxyterminated polybutadiene (CTPB) cured with amines or epoxides, polybutadiene acrylonitrileacrylic terpolymers (PBAN) cured with epoxides, and hydroxy-terminated polybutadiene (HTPE) cured with diisocyanates. PBAN polymers have been utilized as the binder for the propellant for the Space Shuttle, with the following approximate composition:

TABLE 1

| Ingredient | % by weight |
|---|---|
| Solids | 86.00 |
| AP | 69.60 |
| Al | 16.00 |
| $Fe_2O_3$ | 0.40 |

TABLE 1-continued

| Ingredient | % by weight |
|---|---|
| PBAN* | 14.00 |

*cured with an epoxy (DER-331)

The binder composition may also contain a minor amount below 10% of various additives such as cure promoters, stabilizers, burning rate accelerators, thixotropic control agents, or reactive polymeric modifiers such as one or more diols or polyols. The isocyanate is generally present in at least an equivalent amount sufficient to react with the hydroxy prepolymer and hydroxyl substituted modifiers.

In accordance with the process of the present invention, the binder-metal residue remaining after extraction of the ammonium perchlorate is dried and then heated in air or other oxidizing gas mixture at 550° C. to remove the organic compounds by oxidation to gaseous products. The residue remaining following heating is free flowing aluminum powder.

The following examples will serve to illustrate the invention:

EXAMPLE I

Three 5 to 6 gram samples of TP-H1011* propellant containing 16.0% aluminum powder were extracted with benzene to remove soluble polymer and then with acetone, water and then methanol to remove the ammonium perchlorate. The insoluble residue was dried then heated in air at 550° C. for about four hours. The residue remaining after heating was free flowing aluminum powder.
*a PBAN propellant

|  | 1 | 2 | 3 |
|---|---|---|---|
| Sample Wt. (grams) | 5.725 | 5.731 | 5.755 |
| Percent Aluminum Recovered | 16.19 | 16.19 | 16.15 |
| Percent Recovery | 101 | 101 | 101 |

EXAMPLE II

Three 5 to 6 gram samples of TP-H1011 propellant containing 16.0% aluminum were extracted directly with acetone, then water, then methanol to remove part of the polymer and the ammonium perchlorate. The residue was then dried and heated in air at 550° C. for about four hours. The residue remaining after heating was free flowing aluminum powder.

|  | 1 | 2 | 3 |
|---|---|---|---|
| Sample Wt. (grams) | 5.7253 | 5.7310 | 5.7546 |
| Percent Aluminum recovered | 16.24 | 16.24 | 16.28 |
| Percent Recovery | 102 | 102 | 102 |

EXAMPLE III

Six 5 to 6 gram samples of composite propellant containing polymeric binder, aluminum and ammonium perchlorate were extracted directly with water. The residue was then dried and heated in air at 550° F. for four hours. Powdered aluminum remained after heating the sample.

|  | 1 | 2 | 3 |
|---|---|---|---|
| Sample Wt. (grams) | 5.7111 | 5.6552 | 5.6962 |
| Percent Powdered Aluminum Recovered | 16.94 | 16.46 | 16.61 |
| Percent Recovery | 106 | 103 | 104 |

|  | 4 | 5 | 6 |
|---|---|---|---|
| Sample Wt. (grams) | 5.7704 | 6.0255 | 5.9647 |
| Percent Powdered Aluminum Recovered | 16.53 | 17.43 | 16.47 |
| Percent Recovery | 103 | 109 | 103 |

It will be understood that, if desired, the aluminum-binder residue may be extracted from the composite propellant by aqueous leach of the propellant as disclosed in the aforementioned U.S. Pat. Nos. 3,451,789 and 4,198,209 and in the copending application bearing Ser. No. 659,796 filed on Oct. 11, 1984 by Meldon J. McIntosh, the disclosures of which are all expressly incorporated herein by reference.

Thus, in accordance with the invention, there has been provided an effective process for the recovery of aluminum from aluminum-polymer mixtures. The process involves minimal environmental contamination. The polymer is converted to innocuous carbon dioxide. The aluminum is recovered for recycling in a marketable form. The cost of the process for the aluminum recovery is minimal since the only requirement is the energy put into the heating process.

With this description of the invention in detail, those skilled in the art will appreciate that modifications may be made to the invention without departing from its spirit. Therefore, it is not intended that the scope of the invention be limited to the specific embodiment described. Rather, it is intended that the scope of the invention be determined by the appended claims and their equivalents.

What is claimed is:

1. A method of recovering aluminum powder from a solid composite propellant comprising a polymeric binder and an oxidizer comprising the steps of:
   dissolving the composite propellant in a solvent to remove soluble polymer and the oxidizer,
   drying the insoluble residue, and
   heating the dried insoluble residue in an oxidizing gas to a temperature at which the polymer oxidizes but below the melting temperature of aluminum to remove the polymer by oxidation to innocuous gaseous products and to leave a residue of free flowing aluminum powder.

2. A method according to claim 1 in which the dried insoluble residue is heated to a temperature in the range of 400° C. to 660° C.

3. A method according to claim 2 in which the dried insoluble residue is heated in air.

4. A method according to claim 3 in which the dried insoluble residue is heated to a temperature of about 550° C. for about 4 hours.

* * * * *